I. T. ALFRED.
HARVESTER CUTTER BAR.
APPLICATION FILED AUG. 30, 1906.
952,779.
Patented Mar. 22, 1910.
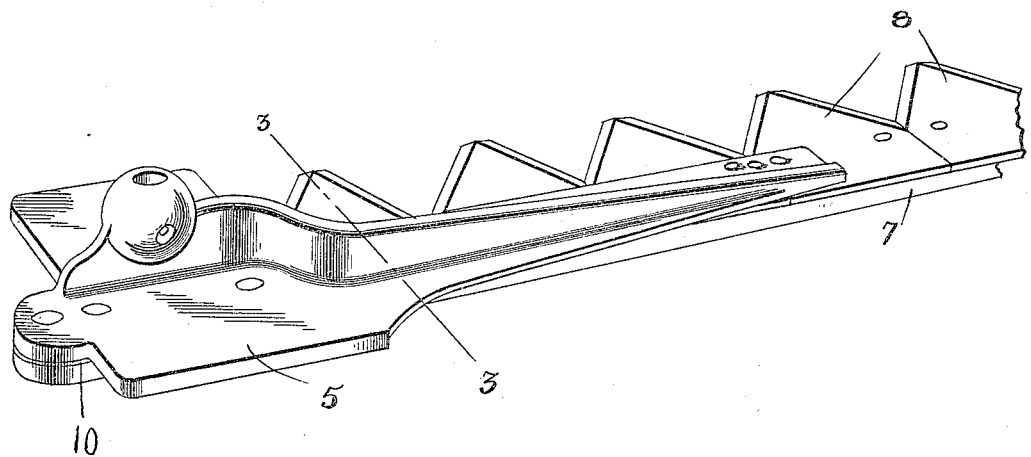
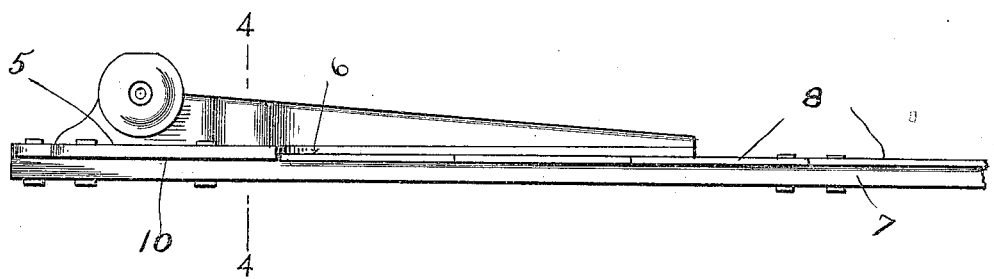
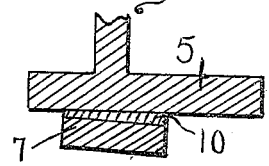
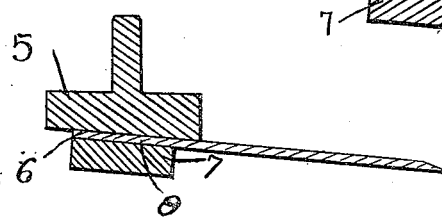
WITNESSES
W. S. Rockwell
James W. Quinn
INVENTOR
I. T. Alfred
BY Chandler & Chandler
Attorneys.

UNITED STATES PATENT OFFICE.

ISAAC THORNTON ALFRED, OF BLACKFOOT, IDAHO.

HARVESTER CUTTER-BAR.

952,779.

Specification of Letters Patent. Patented Mar. 22, 1910.

Application filed August 30, 1906. Serial No. 332,692.

*To all whom it may concern:*

Be it known that I, ISAAC THORNTON ALFRED, a citizen of the United States, residing at Blackfoot, in the county of Bingham, State of Idaho, have invented certain new and useful Improvements in Harvester Cutter-Bars; and I do hereby declare the following to be a full, clear, and exact description of the invention, such as will enable others skilled in the art to which it appertains to make and use the same.

This invention relates to harvester cutter-bars, the object being to so construct a device of that nature, that the knife sections of the bar will be automatically sharpened by the passage thereover of the guard fingers, when the machine is in operation.

The preferred embodiment of the invention is illustrated in the accompanying drawings, wherein, Figure 1 is a perspective view of the improved cutter-bar. Fig. 2 is a side elevation of the same. Figs. 3 and 4 are transverse sections taken, respectively, on the lines 3—3 of Fig. 1, and 4—4 of Fig. 2.

Reference being had to said drawings, 5 designates the knife-heel of the cutter-bar, upon whose inner end is formed a perforated ear of the ordinary type for the attachment of the pitman (not shown), the under face of the outer portion of the knife heel being cut away to form a forward and downward inclined surface, indicated by the numeral 6.

The knife sections 8, which are secured to the knife-bar 7, have their rear ends disposed against said forward and downward inclined surface and will therefore be given a drop or downward inclination transversely of the knife-heel 5, as will be apparent, the knife-bar being similarly inclined by reason of the introduction of a wedge-shaped or beveled center-plate 10 between its inner end and that of said knife-heel.

When the machine is in operation, the passage of the guard fingers (not shown), transversely across the several knife-sections will keep the edges of the latter continuously in sharpened condition, owing to the downward inclination of said knife-sections, such inclination being caused by the disposition of the rear ends of the sections against the downward and forward inclined surface 6, and by the interposition of the plate 10 between the knife-heel and the knife-bar, as above described.

What is claimed, is:—

A harvester cutter-bar comprising, in combination, a knife-heel having the outer part of its under face cut away to form a forward and downward inclined surface; a knife-bar; a plurality of knife sections secured to the knife-bar and having their rear ends disposed against said surface; and a longitudinal wedge-shaped strip interposed between the knife-heel and the knife-bar, whereby the latter and said knife sections will be inclined downwardly transversely of the knife-heel.

In testimony whereof, I affix my signature, in presence of two witnesses.

ISAAC THORNTON ALFRED.

Witnesses:
W. EARL SMITH,
JOHN I. STEWART.